United States Patent
Tanguay

(10) Patent No.: US 9,539,603 B2
(45) Date of Patent: Jan. 10, 2017

(54) ROLLING SPRINKLER HEAD

(71) Applicant: Kurtis Walter Tanguay, Green Bay, WI (US)

(72) Inventor: Kurtis Walter Tanguay, Green Bay, WI (US)

(73) Assignee: Kurtis Walter Tanguay, Green Bay, WI (US)

( * ) Notice: Subject to any disclaimer, the term of this patent is extended or adjusted under 35 U.S.C. 154(b) by 0 days.

(21) Appl. No.: 14/695,566

(22) Filed: Apr. 24, 2015

(65) Prior Publication Data

US 2015/0306610 A1    Oct. 29, 2015

Related U.S. Application Data

(60) Provisional application No. 61/984,399, filed on Apr. 25, 2014.

(51) Int. Cl.
| | | |
|---|---|---|
| *B05B 1/18* | (2006.01) | |
| *B05B 15/06* | (2006.01) | |
| *B05B 1/20* | (2006.01) | |
| *B05B 13/04* | (2006.01) | |
| *A01K 15/02* | (2006.01) | |

(52) U.S. Cl.
CPC ........... *B05B 15/066* (2013.01); *A01K 15/025* (2013.01); *B05B 1/20* (2013.01); *B05B 13/0421* (2013.01)

(58) Field of Classification Search
CPC ...... A01G 25/02; A01G 25/06; A01G 25/023; B05B 3/044; B05B 3/14; B05B 3/16; B05B 1/20; B05B 15/066; B05B 15/067

USPC .......................................... 239/567, 566, 548
See application file for complete search history.

(56) References Cited

U.S. PATENT DOCUMENTS

| | | | | |
|---|---|---|---|---|
| 2,359,690 | A * | 10/1944 | Tarbox ...................... | B05B 1/14 239/553.5 |
| 3,221,996 | A * | 12/1965 | Emmert .................. | A01G 25/00 239/536 |
| 3,430,867 | A * | 3/1969 | Caves ........................ | B05B 1/14 239/542 |
| 3,539,106 | A * | 11/1970 | Ramik ...................... | B05B 1/20 239/145 |
| 3,866,632 | A * | 2/1975 | Schaffer ................ | B29C 47/023 138/125 |
| 4,161,290 | A * | 7/1979 | Hill ........................... | B05B 1/14 239/396 |
| 5,042,719 | A * | 8/1991 | Magris .................... | B05B 3/044 239/242 |

(Continued)

*Primary Examiner* — Davis Hwu
(74) *Attorney, Agent, or Firm* — Gardner, Linn, Burkhart & Flory, LLP

(57) ABSTRACT

The present invention provides a sprinkler head that can attach to a hose, such as a common garden hose, in such a manner as to permit a pet, such as dog, to interact with the sprinkler head and allow the sprinkler head to roll over a ground surface. The sprinkler head may include a container body or elongated body that at least partially encloses a hollow interior volume and can generally withstand a compressive force of a dog bite. A plurality of holes may be formed in a sidewall of the elongated body that are configured to spray streams of pressurized water outward from the hollow interior volume. As the sprinkler head rolls on a ground surface, the elongated body may rotate and move the streams of pressurized water in corresponding rotational movement.

16 Claims, 2 Drawing Sheets

(56) References Cited

U.S. PATENT DOCUMENTS

2006/0102751 A1* 5/2006 Heren .................. B05B 1/1654
                                                239/451
2012/0145813 A1* 6/2012 Kozey .................. B05B 15/066
                                                239/600

* cited by examiner

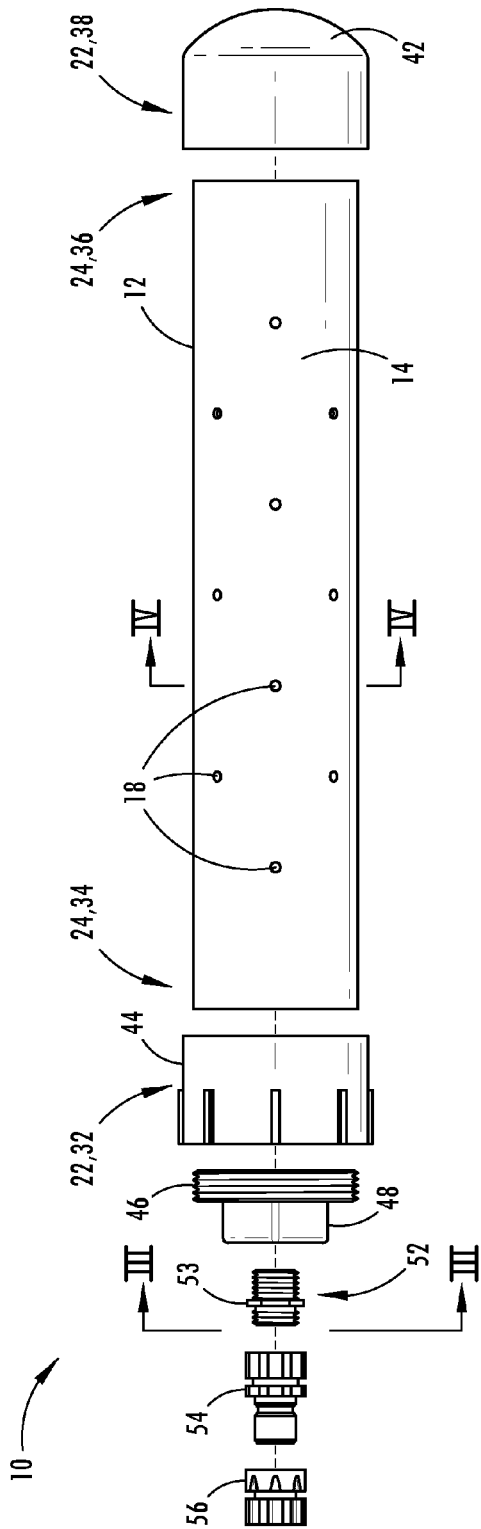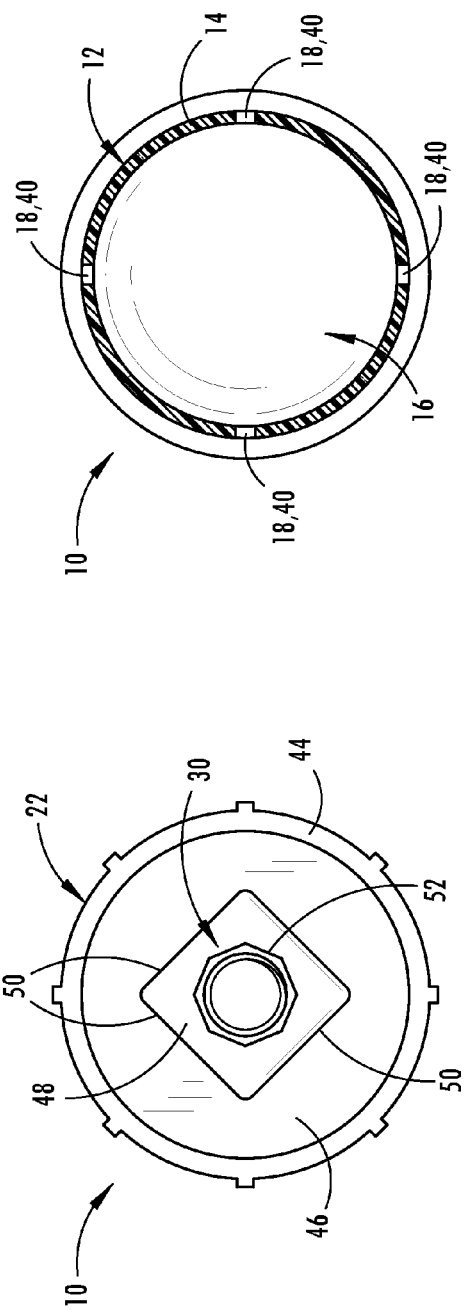

ROLLING SPRINKLER HEAD

CROSS REFERENCE TO RELATED APPLICATIONS

This application claims benefit under 35 U.S.C. §119(e) to U.S. Provisional Patent Application Ser. No. 61/984,399, filed Apr. 25, 2014, the disclosure of which is hereby incorporated herein by reference in its entirety.

FIELD OF THE INVENTION

The present invention generally relates to a water sprinkler for exercising and entertaining dogs, and more particularly to a sprinkler head configured to roll and spray various water jets for a dog to chase and catch.

BACKGROUND OF THE INVENTION

Standard sprinklers on the market typically cannot withstand the bites of medium to large sized dogs that can occur when a dog plays with a sprinkler. Moreover, sprinklers can be harmful to a dog's mouth when the dog bites any brittle plastic or metal on the sprinkler that can be broken with the biting force of a dog's jaw. Accordingly, it can be necessary for some dog owners to closely monitor dogs that have a tendency to play with and bite sprinkler heads, making it difficult to use traditional sprinklers to water lawns in the general vicinity of dogs having these tendencies.

SUMMARY OF THE PRESENT INVENTION

The present invention provides a sprinkler head that can attach to a hose, such as a common garden hose, in such a manner as to permit a pet, such as dog, to interact with the sprinkler head and allow the sprinkler head to roll over a ground surface. The sprinkler head includes a container body or elongated body that at least partially encloses a hollow interior volume and can generally withstand a compressive force of a dog bite. A plurality of holes formed in a sidewall of the elongated body are configured to spray streams of pressurized water outward from the hollow interior volume. As the sprinkler head rolls on a ground surface, the elongated body rotates and moves the streams of pressurized water in corresponding rotational movement.

According to one aspect of the present invention, a rolling sprinkler head for a dog to roll on a ground surface includes an elongated body having a sidewall at least partially enclosing a hollow interior volume. A plurality of holes extend through and are spaced about the sidewall. The plurality of holes are configured to spray streams of pressurized water outward from the hollow interior volume. An end cap is removably attached with an end of the elongated body. The end cap includes a round shape with a peripheral edge that is configured to roll on a ground surface, such that the elongated body rotates and moves the streams of pressurized water in corresponding rotational movement.

According to another aspect of the present invention, a sprinkler head for rolling on a ground surface includes a container body having a sidewall substantially surrounding a hollow interior volume of the container body. The sidewall includes a plurality of holes that extend through the sidewall in an arrangement for spraying streams of pressurized water from the hollow interior volume. An access cap is removably attached with the container body and is removable to access the hollow interior volume. An inlet is coupled with the container body or the access cap. The inlet has a fitting configured to attach with a hose that supplies pressurized water to the hollow interior volume.

According to another aspect of the present invention, a rolling sprinkler head for rolling on a ground surface includes an elongated body having a sidewall substantially surrounding a hollow interior volume of the elongated body. The sidewall includes a plurality of holes extending through the sidewall in an arrangement for spraying streams of pressurized water from the hollow interior volume. A pair of end caps are coupled with opposing ends of the elongated body. One of the end caps includes a fitting that is configured to attach with a hose that supplies pressurized water to the hollow interior volume. The elongated body or one of end caps includes a round shape that is configured to roll on a ground surface, such that streams of pressurized water move in corresponding rotational movement.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is an exploded side elevation view of the rolling sprinkler head of FIG. 1;

FIG. 3 is an end view of the rolling sprinkler head of FIG. 1, showing an inlet having a fitting for attaching a hose; and FIG. 4 is a cross-sectional view of one embodiment of the rolling sprinkler head, taken at line IV-IV of FIG. 2.

DETAILED DESCRIPTION OF EMBODIMENTS

Figure 1:
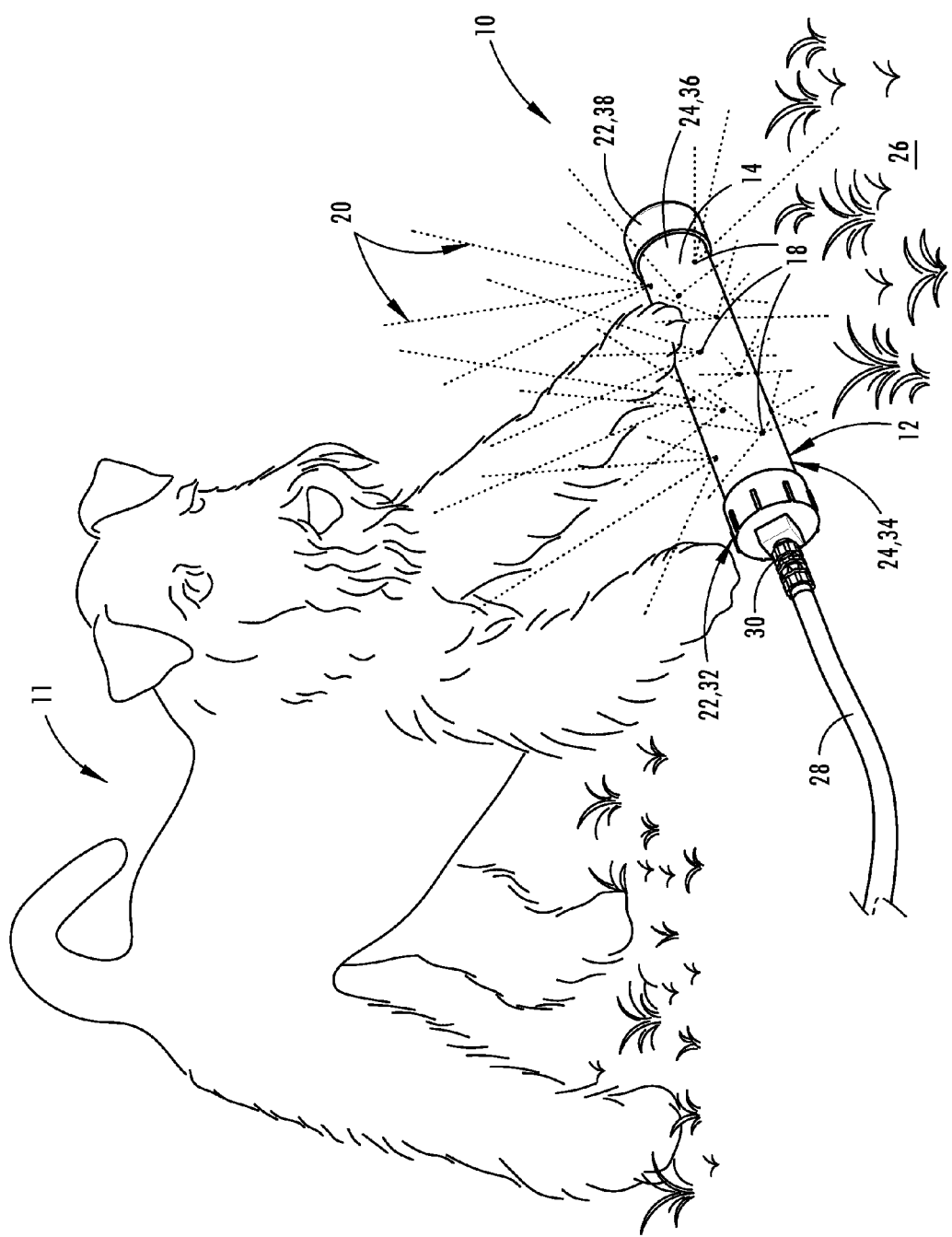
FIG. 1 is a perspective environmental view of a rolling sprinkler head for dogs, according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the drawings and the illustrative embodiments depicted therein, a sprinkler head 10 is provided that can attach to a hose, such as a common garden hose 28, in such a manner as to permit a pet, such as dog 11, to interact with the sprinkler head 10, thereby allowing the sprinkler head 10 to roll over a ground surface 26. The sprinkler head 10 includes a container body or elongated body 12 that at least partially encloses a hollow interior volume 16 and can generally withstand a compressive force of a dog bite. A plurality of holes 18 formed in a sidewall 14 of the elongated body 12 are configured to spray streams of pressurized water outward from the hollow interior volume 16. And, as the sprinkler head 10 rolls on a ground surface 26, the elongated body 12 rotates and moves the streams of pressurized water in corresponding rotational movement.

Referring now to FIGS. 1-4, reference numeral 10 generally designates a rolling sprinkler head that includes a container body or an elongated body 12 having a sidewall 14 substantially enclosing the generally hollow interior volume 16. The plurality of holes 18 extend through the sidewall 14 in an arrangement that is configured to spray streams 20 of pressurized water from the hollow interior volume 16. An access cap or end cap 22 may be coupled, such as fixed or removable attachment, with each of the opposing ends 24 of the elongated body 12. For example, the access or end cap may be removably attached with the elongated body 12 and may be removable by hand, without tools, to access the hollow interior volume 16. The end caps 22 may also be shaped or otherwise configured to roll on a ground surface 26, such that the elongated body 12 rotates and moves the streams 20 of pressurized water in corresponding rotational movement. Further, an inlet 30 may be arranged on the container body 12 or one of the end caps 22, such that the inlet 30 may provide a fitting 52 configured to attach a hose 28 for supplying pressurized water to the hollow interior volume 16 of the sprinkler head 10.

Referring to the embodiment illustrated in FIG. 1, the rolling sprinkler head 10 is attached to a garden hose 28 that is supplying pressurized water to the hollow interior volume 16 (FIG. 4) of the elongated body 12 to generate streams 20 of water spraying from the plurality of holes 18. The garden hose 28 is attached to an inlet 30 disposed on a removable end cap 32 that is threadably attached to a first end 34 of the elongate body 12. A second end 36 of the elongated body 12, opposite from the first end 34, has a fixed end cap 38 that is secured to the elongated body 12 with sufficient bonding force to contain the pressurized water in the hollow interior volume 16 of the elongated body 12 and cause the water to spray out of the plurality of holes 18. However, it is contemplated that in additional embodiments, the first and second caps 32, 36 may be omitted or otherwise coupled with different portions of the container or elongated body 12, such as with portions of a differently shaped container or elongated body 12.

With further reference to the embodiment shown in FIG. 1, the plurality of holes 18 are arranged over the sidewall 14 of the elongated body 12 in a spaced pattern that includes eight rows of holes around the circumference of the elongated body 12, whereby each row of holes is spaced and arranged longitudinally along the elongated body 12, in substantial alignment with the central axis of the elongated body 12. In the illustrated embodiment, the rows of holes alternate between rows with four holes and rows with three holes to provide spacing between the individual holes that maintains strength of the sidewall 14 sufficient to withstand general biting force of a dog. However, as the thickness of the sidewall 14 is increased or otherwise strengthened, additional holes and/or closer spacing may be provided to increase the number of water jets expelling from the sprinkler head 10. As shown in FIG. 4, a single hole 40 from each row of four holes is shown equally spaced around the circumference of the elongated body 12.

It is contemplated that the plurality of holes 18 may include more or fewer holes and may be arranged in a variety of patterns through the sidewall 14, such as a single row, a row in curved or helix shape, a series of rings, a scattered arrangement of holes, an arrangement of holes on a select area of the sidewall, or other conceivable arrangements. In addition, each hole of the plurality of holes 18 in the illustrated embodiment is sized with a diameter of approximately 1.55 mm, but may be larger or smaller, but preferably, although not required, the total cross-sectional area of the combined plurality of holes 18 is generally less than the cross-sectional area of the garden hose 28. As such, the plurality of holes 18 are sized to cause the water entering the hollow interior volume 16 (FIG. 4) though the garden hose 28 to have a larger flow rate exiting the plurality of holes 18, thereby causing the streams 20 of water to spray upward for entertaining a dog.

As shown in FIGS. 1-2, one embodiment of the elongated body 12 is cylindrically shaped and the end caps 22 have a round shape that is also substantially cylindrical, with a larger outer diameter than the elongated body 12 to allow the end caps to contact the ground surface, which in some instances, such as in the case of using the sprinkler head on a flat cement ground surface, can slightly elevate the elongated body 12 above the ground surface 26. In this embodiment, the inner diameter of the round end caps 22 is configured to attach to the cylindrical shape of the elongated body 12. Accordingly, it is contemplated that the elongated body 12 may have an alternative shape, such as a cross-sectional shape of a square or other geometric configuration, whereby an interior surface of the end caps 22 may be adapted with a corresponding geometric configuration to attach to the elongated body 12 and still allow the sprinkler head 10 to roll on the end caps. An additional embodiment of the sprinkler head 10 may also have the end caps 22 attached inside the outer diameter of the container or elongated body 12, such that the elongated body 12 may directly contact the ground surface. In additional embodiments, the container or elongated body 12 may also have additional shapes and it is conceivable that the access or end caps 22 may be integrally formed with the container or elongated body 12 or otherwise omitted.

Referring again to the embodiment depicted in FIGS. 1-2, the fixed end cap 38 is fluidly sealed and fixedly coupled with the elongated body 12 to enclose the second end 36 thereof. In the illustrated embodiment, the fixed end cap 38 includes a domed portion 42 distal from the elongated body 12 having a shape void of sharp edges to prevent a dog from injuring itself when biting, pawing, or otherwise interacting with the rolling sprinkler head 10. The removable end cap 32, as shown in the embodiment illustrated in FIGS. 1-3, includes a first portion 44 fixedly coupled with the first end 34 of the elongated body 12 and a second portion 46 threadably attached to the first portion 44. More specifically, the second portion 46 in the illustrated embodiment has threads on an outer circumference thereof that mate in a coaxial arrangement with corresponding threads on an interior circumference of the first portion 44. A seal, such as threaded seal tape (i.e. polytetrafluoroethylene (PTFE) film or Teflon tape) or an O-ring, may be provided between the first and second portions 44, 46 to improve the fluid sealing therebetween. It is understood that the second portion 46 may be additionally or alternatively coupled with the first portion 44, such as with fasteners or a latch, to also allow the second portion 46 to be removed to access the hollow interior volume 16 (FIG. 4). Access to the hollow interior volume 16 by removing the second portion 46 of the removable end cap 32 allows a user to use their hand to clean the hollow interior volume 16 of accumulated debris or remove particulate that may accumulate and block the plurality of holes 18 from spraying water. It is also conceivable that the fixed end cap 38 may additionally or alternatively include a removable portion to allow for access to the hollow interior volume 16.

As further illustrated in FIG. 1-3, the second portion 46 of the removable end cap 32 has a protrusion 48 extending outward away from the hollow interior volume 16 (FIG. 4) with a square shape defining side surfaces 50 that may be used for gripping the second portion 46 by hand or with a corresponding hand tool and unthreading it from the first portion 44. Additional embodiments of the protrusion 48 may include alternative shapes that are otherwise shaped for gripping and detaching the second portion 46 to expose the hollow interior volume 16 of the elongated body 12. As also shown, the inlet 30 on the removable end cap 32 is coaxially positioned relative to central axis of the elongated body 12.

An inlet fitting 52 may be attached to the elongated body 12 or one of the end caps 22 for attaching a garden hose that supplies the pressurized water to the hollow interior volume 16. As shown in FIG. 2, the inlet fitting 52 is fixedly coupled with the second portion 46 of the removable end cap 32 and fluidly sealed therewith. The fitting 52 includes a first portion, shown as a threaded extension 53 and a male nozzle connector 54 that together, coupled with the removable portion 46 of the access cap 32. The illustrated nozzle connector 54 is threadably coupled with the threaded extension 53. A second portion of the fitting 52, shown as a hose receiver 56, attaches to the garden hose. The illustrated nozzle connector 54 rotatably couples with the hose receiver 56 to provide a swivel fitting 52 that permits the first portion to pivot relative to the second portion about a rotation axis. As illustrated, the rotation axis of the swivel fitting 52 is coaxial with the central axis of the elongated body 14 for permitting the hose 28 to remain generally stationary upon rotation of the elongated body 14 of the sprinkler head 10, thereby allowing the nozzle 54 to freely rotate relative to the hose receiver 56 and preventing kinking of the hose 28, loosening the connection between the garden hose 28 and the removable end cap 32, and unthreading of the second portion 46 of the removable end cap 32 from the first portion 44 thereof.

In operation of the rolling sprinkler head 10, as shown in FIG. 1, the water entering the elongated body 12 from the garden hose 28 is pressurized enough to spray from the plurality of holes 18 for a dog to play with or try to catch the water, which may cause the dog to bite and/or roll the sprinkler head 10. Specifically, the elongated body 12 in the illustrated embodiment may roll axially causing the water streams 20 spraying from the rows of the plurality of holes 18 to rotate in corresponding manner to create a series of fan-shaped curtains of water streams 20 extending radially from the elongated body 12. To generate the upward directed streams 20 of water, the hollow interior volume 16, as shown in FIG. 4, is substantially filled with pressurized water, also causing water to spray from all the plurality of holes 18 simultaneously. However, in additional embodiments, it is contemplated that only some of the plurality of holes 18 may spray water based on the water pressure and rotational orientation of the elongated body 12.

With respect to the materials used to construct the illustrated embodiment, the elongated body 12 and the round end caps 22 comprise polyvinyl chloride (PVC) configured to withstand a biting force of a dog. Specifically, the illustrated embodiment of the elongated body 12 is made from four inch diameter PVC piping, although a substantially identical embodiment may use two inch diameter PVC piping for smaller dogs. Also, the components of the inlet 30, including components of the inlet fitting 52, comprise metal material, such as brass. However, PVC may also be used for one or more of the components of the inlet 30. Attaching generally fixed components of inlet 30 or portions of the round end caps 22 to the elongated body 12 may be done with various adhesives, such as glues and cements, tape, mechanical fastening, or other means of attachment to provide generally fluid sealing as generally understood by one having ordinary skill in the art. It is also understood that alternative polymer materials and composites may be used for one or more of the elongated body 12, the round end caps 22, or the inlet 30 components. The material used may be configured to be slightly pliable or may simply be configured with sufficient strength to withstand biting force of a dog, rolling on rigid surfaces such as cement, and other potential impact forces from general use under water pressure and with water potentially having cold temperatures relative to the potentially hot exterior air temperatures.

This rolling sprinkler head 10 provides an improved water sprinkler for dogs to exercise and entertain themselves. The dog can generally nip at and chew on the rolling sprinkler head without significantly damaging the sprinkler head 10 or injuring the dog. Further, the rolling sprinkler head 10 may be placed on a concrete ground surface for a dog to play with the sprinkler head 10, which provides an added benefit of the dog's nails are being filed down at the same time as exercising.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A rolling sprinkler head for a dog to roll on a ground surface, said rolling sprinkler head comprising:
    an elongated body having a rigid sidewall at least partially enclosing a hollow interior volume and a plurality of holes extending through and spaced about the rigid sidewall;
    wherein said plurality of holes are configured to spray streams of pressurized water outward from said hollow interior volume responsive to receiving water from a hose;
    an end cap removably attached with a first end portion of said elongated body;
    wherein an opposing second end portion of said elongated body and at least one of said end cap and said first end portion includes a round shape with a diameter that is greater than an intermediate portion of said elongated body and a peripheral edge that is configured to roll on a ground surface, such that, when said elongated body is rolled about an axis defined between said first and second end portions, said elongated body contemporaneously rotates and moves the streams of pressurized water in corresponding rotational movement; and
    a swivel fitting disposed between said end cap and a hose receiver configured to securely attach a hose, wherein said swivel fitting is coaxially aligned with said axis of said elongated body for permitting the hose to remain generally stationary upon rotation of said elongated body, thereby preventing kinking of the hose and loosening the connection between the hose and said hose receiver.

2. The rolling sprinkler head of claim 1, wherein said elongated body includes a cylindrical shape with said rigid sidewall defining an outer circumferential surface of said cylindrical shape.

3. The rolling sprinkler head of claim 1, wherein said elongated body comprises a rigid polymer configured to withstand a biting force of a dog.

4. The rolling sprinkler head of claim 1, wherein said end cap includes an inlet coupled with said swivel fitting and configured to receive pressurized water into said hollow interior volume.

5. The rolling sprinkler head of claim 1, further comprising a second cap coupled with said second end portion of said elongated body, wherein at least one of said first end cap and said second end cap is threadably attached to said elongated body and removable by hand to access said hollow interior volume.

6. The rolling sprinkler head of claim 1, wherein said plurality of holes are spaced equally around said elongated body.

7. A sprinkler head for rolling on a ground surface, said sprinkler head comprising:
    a container body having a rigid sidewall substantially surrounding a hollow interior volume of said container body, wherein said rigid sidewall includes a plurality of holes extending through said rigid sidewall in an arrangement for spraying streams of pressurized water from said hollow interior volume, and wherein said container body is configured to roll over a ground surface about a rolling axis;
    an access cap removably attached with said container body and removable to access said hollow interior volume; and
    a swivel fitting having (i) a first portion fixedly coupled with one of said container body and said access cap and (ii) a second portion configured to securely attach a hose, wherein said swivel fitting is configured to receive pressurized water that is supplied to said hollow interior volume, and wherein said first portion pivots relative to said second portion about a rotation axis that is generally aligned with said rolling axis for permitting the hose to remain generally stationary upon rotation of said container body, thereby preventing kinking of the hose and loosening the connection between the hose and said second portion of said swivel fitting.

8. The sprinkler head of claim 7, wherein said access cap includes a round shape with a peripheral edge that is configured to contact a ground surface upon rolling said container body, thereby moving the streams of pressurized water in corresponding rotational movement.

9. The sprinkler head of claim 7, wherein said container body includes a cylindrical shape with said rigid sidewall defining an outer circumferential surface that is configured to roll on a ground surface.

10. The sprinkler head of claim 7, wherein said container body comprises a polyvinyl chloride polymer configured to withstand a biting force of a dog.

11. The sprinkler head of claim 7, wherein said access cap includes an inlet for engaging said first portion of said swivel fitting.

12. A rolling sprinkler head for rolling on a ground surface, said rolling sprinkler head comprising:
    an elongated body having a rigid sidewall substantially surrounding a hollow interior volume of said elongated body, wherein said rigid sidewall includes a plurality of holes extending through said rigid sidewall in an arrangement for spraying streams of pressurized water from said hollow interior volume;
    a pair of end caps coupled with opposing ends of said elongated body to enclose said hollow interior volume, wherein one of said pair of end caps includes an inlet configured to receive pressurized water to the into said hollow interior volume;
    wherein at least one of said elongated body and said pair of end caps includes a round shape that is configured to roll on a ground surface about a rolling axis, such that the streams of pressurized water move in corresponding rotational movement; and
    a swivel fitting having a first portion coupled with said inlet and second portion configured to securely attach a hose, wherein said first portion pivots relative to said second portion about a rotation axis that is generally aligned with said rolling axis for permitting the attached hose to remain generally stationary upon rotation of said elongated body, thereby preventing kinking of the hose and loosening the connection between the hose and said second portion of said swivel fitting.

13. The rolling sprinkler head of claim 12, wherein at least one of said pair of end caps is threadably attached to said elongated body and removable by hand to access the said hollow interior volume.

14. The rolling sprinkler head of claim 12, wherein said plurality of holes are spaced equally around said elongated body.

15. The rolling sprinkler head of claim 12, wherein said elongated body includes a cylindrical shape.

16. The rolling sprinkler head of claim 12, wherein said elongated body comprises polyvinyl chloride configured to withstand a biting force of a dog.

\* \* \* \* \*

UNITED STATES PATENT AND TRADEMARK OFFICE
CERTIFICATE OF CORRECTION

PATENT NO. : 9,539,603 B2
APPLICATION NO. : 14/695566
DATED : January 10, 2017
INVENTOR(S) : Kurtis Walter Tanguay It is certified that error appears in the above-identified patent and that said Letters Patent is hereby corrected as shown below:

In the Claims

Column 7
Line 16, "the" should be --said--

Column 8
Line 48, "to the into" should be --into--

Column 8
Line 66, "the said" should be --said--

Signed and Sealed this
Twenty-fourth Day of October, 2017

Joseph Matal
*Performing the Functions and Duties of the
Under Secretary of Commerce for Intellectual Property and
Director of the United States Patent and Trademark Office*